Oct. 23, 1928.
T. B. WRIGHT
1,689,097
METHOD OF MAKING RECEPTACLES
Filed Oct. 2, 1922
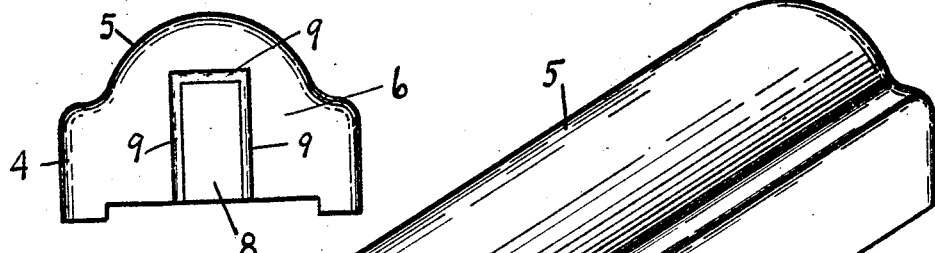
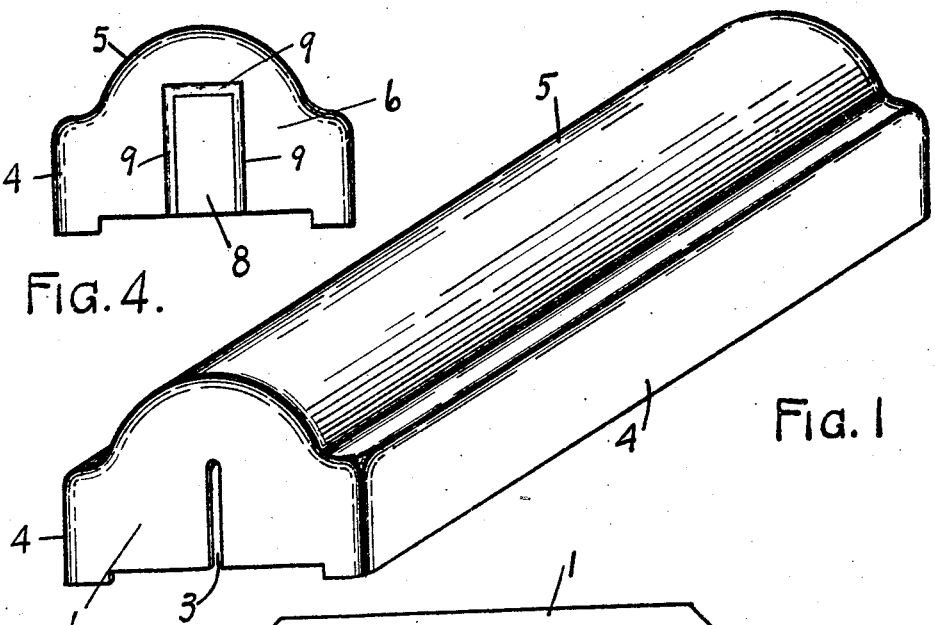
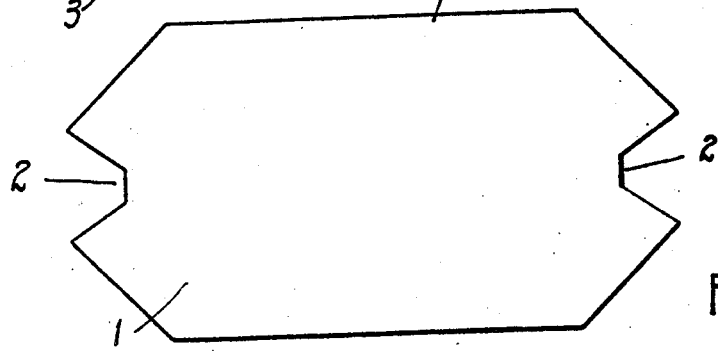
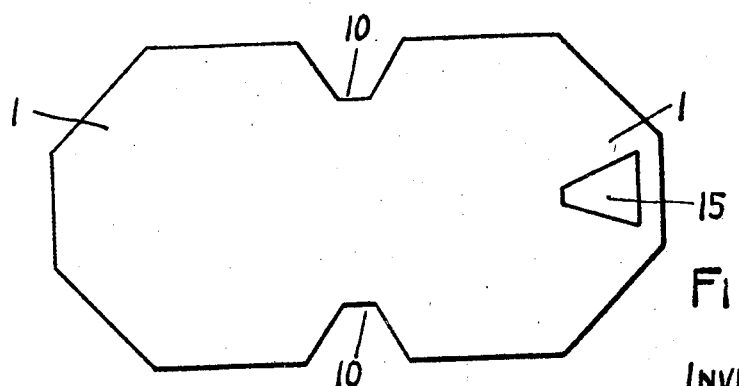

Patented Oct. 23, 1928.

1,689,097

UNITED STATES PATENT OFFICE.

THOMAS B. WRIGHT, OF CINCINNATI, OHIO.

METHOD OF MAKING RECEPTACLES.

Application filed October 2, 1922. Serial No. 591,992.

The invention relates to a method of making receptacles from sheet metal or the like, and in said method, a sheet metal blank is cut in a special way to enable the dies subsequently used, to press, draw and iron the metal readily and quickly into the form or shape desired. Due to the special cutting of the metal blank, I can form a deeper vessel or receptacle with the dies, without cracking the metal. The essential feature in connection with the peculiar cutting of the metal enables the dies to do their work more readily and more efficiently without detriment and deterioration to the finished receptacle or vessel.

By slitting or cutting out the metal of the blank out of which the product is to be pressed, drawn, and ironed, I dispense with annealing the metal, as the corners in being drawn down and ironed are not crystallized to any extent.

By receptacle or vessel is meant a depressed rectangular, oval, or other shaped depressed metal part, as for example, a box-shaped complementary part of some article of manufacture, a depressed hollow utensil, a hollow depressed body part or lid; in the present instance, illustrated in the drawing, I show part of a lunch kit used in connection with vacuum bottles, or the like, not however, confining myself to any precise form, shape, or contour.

The invention further relates to the construction of the part pressed and drawn after same has passed through the dies, in order to form some specific construction.

The various features and advantages of my invention will become apparent from the following specification:

In the accompanying drawing forming part of this specification:

Fig. 1, is a perspective view of the top or lid part of a lunch kit usually employed in carrying vacuum bottles, formed after my process, just as the same comes from the dies, Fig. 2, is the blank form out of which said part shown in Fig. 1, has been stamped and drawn, Fig. 3, is a similar blank, except that cut-away recesses are on the side instead of at the end of the blank, and Fig. 4, is an end view of the end shown with the slot therein, in Fig. 1, with the finished piece placed in position at the point where said slot is placed.

In carrying out my invention relative to the parts shown in Figs. 1, 2, 3, and 4, I take a blank as is shown in Fig. 2, and place it in stamping, drawing, and ironing dies, and on account of the recesses 2, I form a construction as shown in Fig. 1, at each end a slit as 3 will be present on account of the peculiar form given to the recesses 2 after the dies have drawn the article. This slit will be left as shown in Fig. 1.

The article shown in Figs. 1 and 4 is made up of a base 4 and an elongated dome-shaped top 5, generally made integral and ends 6, also generally made integral with the base and dome-shaped top. The ends 6 may be left as shown in Fig. 1, where the slit 3 will be covered in some manner or cut out if needed and a piece as 8 secured to the end parts 6 in any manner and I usually place beads as 9 around the cut-away part, under which a card containing the name of the manufacturer or owner may be slid; this end part may be finished in any other way found desirable.

After the blank which is shown in Fig. 3, is stamped and drawn, a slit similar to slit 3, shown in Fig. 1, will be formed on the sides instead of the ends of the receptacle, the recesses 10 allow this to be done.

I may cut the recesses of the character herein referred to in any part of a blank in order to enable me to more quickly and efficiently draw receptacles of various kind, without breaking the material or cracking same, out of which they are made, and I may thus also draw them deeper, and I also may use a cheaper grade of material and still form a first class receptacle in this manner; I may also produce a cheaper receptacle, if need be.

By this construction, I can form a cheaper and stronger receptacle, and it can be done quicker. The method above described will save material as the metal will not crack and each stamping and drawing of the metal will be practically perfect for the use intended.

The slit 3, when the receptacle is drawn is usually the width of the space represented by the line X. It will be understood that any form of dies may be employed which will do the work practically.

It will also be understood that the blank out of which the article is to be pressed and formed, may be of any contour, and that the notches, recesses, cutouts, or the like, cut out of the edge of the metal, may be of any desired shape or form.

By using my process and method, I can draw and iron very deep vessels or receptacles without hardening certain parts, and also prevent crystallization, I also form each vessel made of material having approximately uniform thickness, also there will be no weak spots.

The vessel or receptacle may be of a round, oval or other form when finished. I may place the edge slit or recess back from the edge, as shown at 15, see Fig. 3.

What I claim as new and my invention and desire to secure by Letters Patent is:—

1. A method of making a receptacle, consisting in cutting a blank out of sheet metal, also cutting oppositely disposed notches in the edge portions of said blank, and drawing and ironing the blank to provide a semi-cylindrical body portion and a rectangular shaped edge portion having plane side and end walls.

2. A method as claimed in claim 1 in which the notches are formed in the ends of the blank and provide recesses in the edge portion of the finished article.

3. A method as claimed in claim 1 in which the notches are formed in the ends of the blank and provide recesses in the edge portion of the finished article, and covering the recesses with metal pieces to close the same.

4. A method of making receptacles consisting in cutting a piece of sheet metal to form a blank having substantially parallel side edges and outwardly converging end edges, cutting notches in the blank at the ends of the latter and between the converging edges, and then subjecting the blank to pressure to cause the central portion of the blank to assume a semi-cylindrical shape and the edge portions of the blank to form a rectangular figure having slots at its ends.

In testimony whereof, I affix my signature at Cincinnati, Ohio, this 20th day of September, 1922.

THOMAS B. WRIGHT.